(12) United States Patent
Kavitha et al.

(10) Patent No.: US 8,473,509 B2
(45) Date of Patent: Jun. 25, 2013

(54) SYSTEMS, METHODS, AND APPARATUS FOR UTILITY COMMON POOL DATABASE

(75) Inventors: Andoji Kavitha, HITEC (IN); Vinoth Kumar Mohan, HITEC (IN); Phillip Robinson, Cambridge (GB)

(73) Assignee: General Electric Company, Schenectady, NY (US)

( * ) Notice: Subject to any disclaimer, the term of this patent is extended or adjusted under 35 U.S.C. 154(b) by 57 days.

(21) Appl. No.: 13/107,120

(22) Filed: May 13, 2011

(65) Prior Publication Data

US 2012/0290604 A1 Nov. 15, 2012

(51) Int. Cl.
*G06F 17/30* (2006.01)
(52) U.S. Cl.
USPC ............................ 707/769; 707/791; 709/203
(58) Field of Classification Search
USPC .................. 707/736, 769, 770, 791; 709/203
See application file for complete search history.

(56) References Cited

U.S. PATENT DOCUMENTS 7,206,806 B2 *  4/2007  Pineau ........................... 709/203
8,046,411 B2 * 10/2011  Hayashi et al. ............... 709/204

2006/0230006 A1  10/2006  Buscema
2009/0171976 A1   7/2009  Obara et al.
2009/0210140 A1   8/2009  Short, III et al.

FOREIGN PATENT DOCUMENTS

EP       2306338 A1     4/2011
WO    2009151928 A2    12/2009

OTHER PUBLICATIONS

Search Report for Europen Application No. 12167388.3 dated Jul. 27, 2012.

* cited by examiner

*Primary Examiner* — Cheryl Lewis
(74) *Attorney, Agent, or Firm* — Sutherland Asbill & Brennan LLP

(57) ABSTRACT

Certain embodiments of the invention may include systems, methods, and apparatus for providing for utility common pool database. According to an example embodiment of the invention, a method is provided for utilizing a common pool database. The method may include transmitting, by one or more networks, one or more queries comprising location data from a mobile device to a server in communication with a database; receiving, from the database by the one or more networks, localized field information based at least in part on the one or more queries; and outputting the localized field information via the mobile device.

20 Claims, 3 Drawing Sheets

SYSTEMS, METHODS, AND APPARATUS FOR UTILITY COMMON POOL DATABASE

FIELD OF THE INVENTION

This invention generally relates to a database, and in particular, to a utility common pool database.

BACKGROUND OF THE INVENTION

Field crews that maintain or repair utility-related equipment typically carry mobile devices, such as cell phones or laptops, to access utility information from a local or remote database. In most of the cases, the field crew must have an awareness of any related utility infrastructure in their current location, so for example, a field crew that is sent to repair an underground power line does not accidently sever a gas line. However, many aspects of related utility data may not be readily available, or updated in the particular database that is being accessed for information. In certain scenarios, the field crew may need to view multiple utility databases in order to understand the layout, etc. and multiple utility databases may need to be updated after modifications are made. A need remains for improved systems, methods, and apparatus for a utility common pool database.

BRIEF SUMMARY OF THE INVENTION

Some or all of the above needs may be addressed by certain embodiments of the invention. Certain embodiments of the invention may include systems, methods, and apparatus for a utility common pool database.

According to an example embodiment of the invention, a method is provided for utilizing a common pool database. According to an example embodiment, the method may include transmitting, by one or more networks, one or more queries comprising location data from a mobile device to a server in communication with a database; receiving, from the database by the one or more networks, localized field information based at least in part on the one or more queries; and outputting the localized field information via the mobile device.

According to another example embodiment, a system is provided for controlling and coordinating common pool database information. The system includes a database; a server comprising at least one processor in communication with the database; one or more networks in communication with the server; and at least one mobile device configured for: transmitting, by one or more networks, one or more queries comprising location data to the server; receiving, from the database by the one or more networks, localized field information based at least in part on the one or more queries; and outputting the localized field information on the mobile device.

According to another example embodiment, an apparatus is provided for controlling and coordinating common pool database information. The apparatus includes a database; a server in communication with the database and one or more networks, the server comprising at least one processor and configured for: receiving one or more queries comprising location data; and outputting stored localized field information from the database to one or more external devices, by the one or more networks, based at least in part on the one or more queries.

Other embodiments and aspects of the invention are described in detail herein and are considered a part of the claimed inventions. Other embodiments and aspects can be understood with reference to the following detailed description, accompanying drawings, and claims.

BRIEF DESCRIPTION OF THE FIGURES

Reference will now be made to the accompanying tables and drawings, which are not necessarily drawn to scale, and wherein.

DETAILED DESCRIPTION OF THE INVENTION

Figure 1:
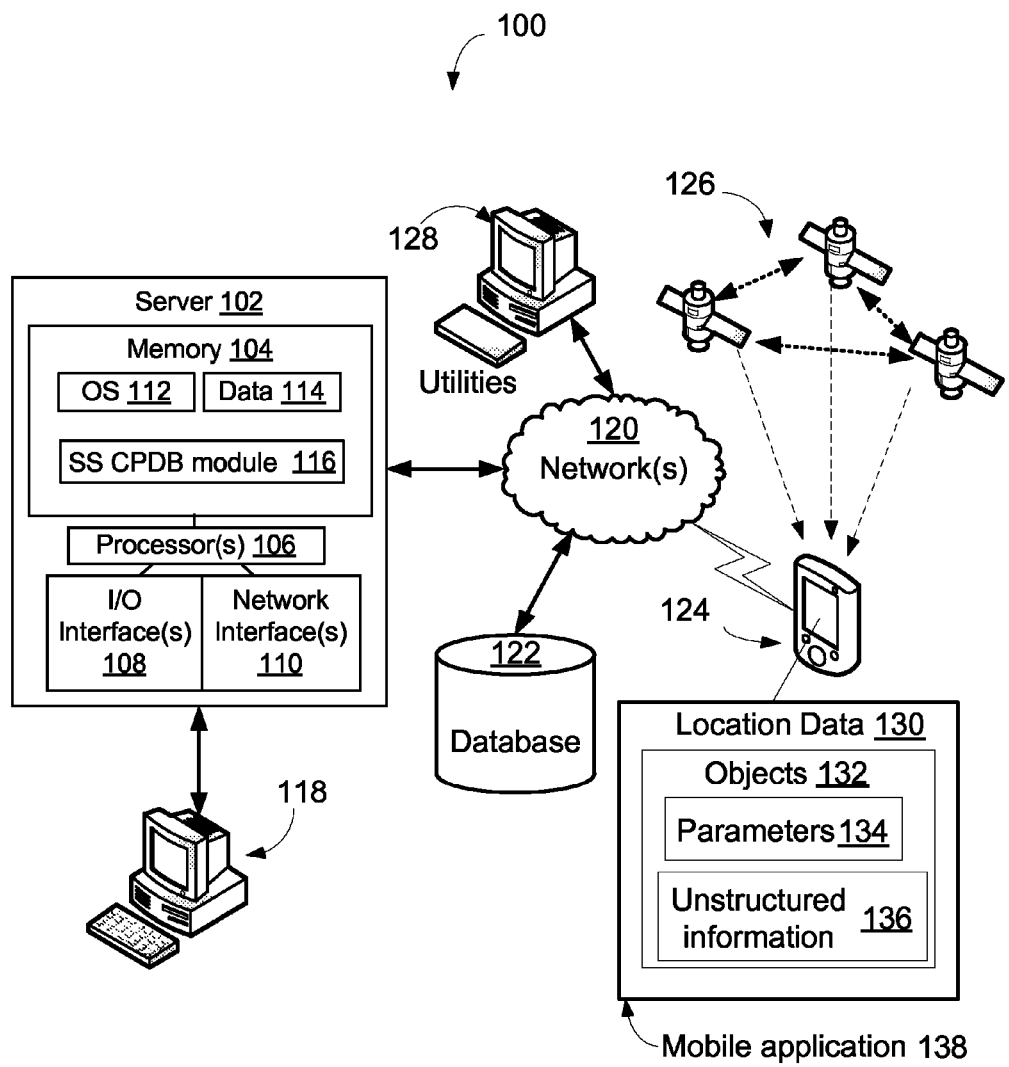
FIG. 1 is a block diagram of an illustrative common pool database system, according to an example embodiment of the invention.

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Certain embodiments of the invention may enable maintaining and updating a common pool database (CPDB) for a region or location. In example embodiment, utility companies may utilize the CPDB by viewing all the real world objects around the region of interest. According to an example embodiment, the CPDB may allow the utility to plan, analyze and update certain assets.

According to an example embodiment of the invention, the CPDB may allow representation of real world or planned objects to be gathered, arranged, and/or represented in a manner in a way in which everyone with access to the database may see the information, and may contribute to the database by adding/deleting objects, or providing other information that may be relevant. In accordance with an example embodiment of the invention, it is recognized that different people may see different things associated with a particular location or coordinate. For example, an electrical engineer may see a transformer near a certain X1, Y1, global positioning system (GPS) coordinate. In an example embodiment, a structural engineer may look at the same coordinate and may not be interested in the transformer, but he/she may note that an object (the transformer) is mounted on a pole. In another example, a farmer may see the object (the pole and transformer) is located on a red soil. In yet another example, a gas engineer might notice a gas valve or service point near the object. According to an example embodiment, different people may observe the same location, but may notice certain things that are of interest to them, and perhaps not readily observed or comprehended by others.

According to an example embodiment of the invention, a field crew may utilize a mobile application program to calculate (for example, using GPS coordinates) the current spatial location of an asset or device in the field. In an example embodiment, the mobile application program may send the calculated spatial location to a server. In an example embodiment, a server side application may send requests to a common pool database (CPDB) server to return any data with some pre-defined proximity range with respect to provided location. According to an example embodiment, upon receiving the CPDB request, the server may process styles to the data and send a layered snapshot representation of the data to the mobile application program. According to an example embodiment, the field crew holding the mobile device may see the data from the server in a layered fashion, which may allow them analyze the data, run simple queries on styles, update the database, etc.

In an example embodiment, while commissioning service associated with the field, the field crew may be planning job or performing maintenance. In an example embodiment, the field crew may physically be on location, and may query the mobile application program, which may retrieve and provide spatial GPS coordinates. In an example embodiment, the spatial coordinates and proximity range distance to the location may be passed on to a server side application program. According to an example embodiment of the invention, once the view is defined, the server may initiate a request to a CPBD and may assemble and send a mapping of relevant information to the mobile device.

According to example embodiments of the invention, layers may be utilized in the data storage, and/or data representation. According to an example embodiment, one layer may be a public layer, in which data from the common public may be stored or represented. In an example embodiment, the public layer may allow objects to be located or viewed spatially. In an example embodiment, the public layer may behave as a visualization medium of the real world. According to an example embodiment, data from this medium may be considered during planning. According to an example embodiment, the data associated with this layer may be accessible to everyone.

According to an example embodiment, another layer may be an authorized layer, in which all can view the data in this layer but only authorized people are given the access to update the records. In an example embodiment, utilities that have no objection in sharing their database can use this medium.

According to an example embodiment, another layer may be a restricted layer. According to an example embodiment, the objects in the restricted layer may be restricted to authorized users. There exists a chance that someone could insert a restricted object through a public layer, however, in an example embodiment, such records may be handled by an integrity check, and priority may be given in the order of: (1) the restricted layer, (2) the authorized layer, and (3) the public layer. In an example embodiment, if the object is identified belonging to restricted layer, and it is determined that it was duplicated in the public layer, then the object may be restored in restricted layer. In an example embodiment, a notification may be sent to the CPDB administrator, alerting the administrator that an attempt to duplicate has made with sufficient details. According to an example embodiment, tools may be available for use with the CPDB that could allow one to see how data has been changed over time. In an example embodiment, an option may be selected to view or animate data logged within a particular period. According to an example embodiment, visualizations may be utilized as an aid to the back office records maintenance personnel who may utilize the visualizations to aid in preparing a permanent record, for example.

According to an example embodiment, the CPDB may include a separate, persistent data store full of time-stamped data entries. For example, according to an embodiment, each table in the database may include a mixture of objects holding spatial coordinates as a primary key. In an example embodiment each object structure in the table may be made up of fields and data, which may be created and modified. For example, at location X1, Y1, a person standing in front of a main pipe may report the following data: Object Name: Main Pipe; Material: Steel; Length: 20 Meters; Embedded Valves: 3, etc. According to an example embodiment, another person standing in the same location may report the following data about road details: Object Name: Road; Address: XYZ; Shortest Path to reach this road: Via Road B; etc.

According to an example embodiment, the stored data may be processed back to view requests by publishing the current location object structure before publishing the data. In an example embodiment, such process may help users modify data in a consistent structural fashion. According to an example embodiment, a time-stamp may be created if the same object is modified by different users or by the same user. According to an example embodiment, object records can be created and/or updated to the CPDB using text messaging or short messaging service (SMS) with a geographical location as a spatial key. In another example embodiment, object records can be created and/or updated to the CPDB through an Internet or web interface.

According to an example embodiment, field crews may access and utilize the CPDB using one or more mobile devices. In an example embodiment, a mobile device may have a built-in GPS receiver for capturing current location spatial coordinates. According to an example embodiment, the GPS coordinates may be utilized in a first request to a server side application program for CPDB queries. In an example embodiment, after receiving coordinates, the server side application program may generate a query to access table data in the CPDB. According to an example embodiment, such queries may be standard database queries, which may include a primary key and specific object data as criteria.

In an example embodiment, CPDB may handle query processing given by server side application program may perform one or more of the following elements or steps:

1) Perform an authentication check (for example, check for field crew authentication level);
2) Search for matching spatial coordinates;
3) Record the field crew authentication level;
4) Return to the server side application program information related to the objects belonging to the public, authorized, or restricted layer;
5) If database query contains more than one keyword (such as time stamp or individual objects data) then the relevant information may be sent back to the server side application program.

According to an example embodiment, a resulting set of data pertaining to objects in the current location may be retrieved at the server side. In an example embodiment, the server side application program may processes data from resulting set and may create a set of network views, which may include snapshots or renderings. According to an example embodiment, views may be created in such a way that objects from each database can be presented on a mobile application program in a layered fashion. In an example embodiment, each view may show all objects in a given proximity range. In an example application, the server side application program may handle multiple requests from multiple field crew devices based on first come first serve basis. In an example application the server side application program may handle multiple requests from multiple field crew devices based on field crew service area belonging to critical customer sites, or any emergency or crisis situation. According to an example embodiment, the user may update required data either in traditional global information system database or in the CPDB.

According to an example embodiment, a mobile device may include one or more mobile application programs pertaining to single product domain (for example, an electric domain) complying with utility traditional data. In an example embodiment, the user may have access to non-product and product data from CPDB database using query based protocol communication.

According to an example embodiment, the server side application program may create queries based on them mobile application program requests using CPDB data. In an example embodiment, when there is a need to access the CPDB database, a mobile user (for example a person in a field crew) may request or update information in terms of current location coordinates, object data in the current location, or within a buffer distance.

According to an example embodiment, the server side application program may prepare snapshots that can be received on a mobile device. In example embodiments, various styles may be applied to objects in different statuses and datasets. According to an example embodiment, a layered view may be created with all datasets, and the layered view may be flexible enough to include individual utility networks or all selected networks. According to an example embodiment, upon selection of an object, a database query may be initiated and may be processed to a server side application program, which may in turn communicate with the CPDB. According to an example embodiment, the resulting set of object information may be shown on mobile application program. According to an example embodiment, an object editor may be utilized in the preparation of the view. According to an example embodiment, when a job commission is completed, changes maybe sent back to the CPDB via the server side application program, or short message service (SMS).

According to example embodiments of the invention, there may be different scenarios for which users of the mobile application program may operate on the CPDB database.

Scenario 1: users may wish to know object information in a proximity range of distance from his or her current location. For example, the user may query the CPDB based on coordinates taken from a GPS device. For example, suppose an electric network design crew wants to find all objects information from the current location to some proximity range of distance. In such an example application, the server side may creates a query based on coordinates for sending to the CPDB which may return a result set of different coordinates mapping to mixture of objects. In an example embodiment, the server side application program may views with all datasets networks.

Scenario 2: A particular user may be interested only in transformer objects. In an example embodiment, the user may select the option to show views with all nearby transformers in the given network. In an example embodiment, the user may update information details related to the transformer, for example: the transformer current location, maintenance date, scheduled maintenance, oil temperature, load on transformer, outside temperature, maintenance performed, reason for maintenance, status, verbose report of maintenance, outage history, and other pertinent data regarding the object.

Scenario 3: A particular user may be interested only in a gas pipe. In an example embodiment, a user may select the main pipe in the current location. According to an example embodiment, the user may view or update leaks, leak history, dates of leaks, reason for leaks, criticality, repair status, changes in soil, intersecting networks, and any other information related to the object.

Scenario 4: A particular user may be given the flexibility to analyze and/or query non-product objects. For example, a query may be run based on objects styles, colors and symbols. According to an example embodiment, a dataset may be based on visual age analysis of field facilities. In an example embodiment, utilities can perform graphical age analysis or coding (by color and/or symbol) of different types of utility facilities by age or how long the facilities have been installed in the field. Colors and/or symbols may be used to represent any of the following: frequent fault history on each asset; regularly maintained assets critical assets, and/or points where different utilities intersect each other. For example: a gas pipeline maintenance field crew may wish to find any high voltage electrical objects crossing the pipeline but the user doesn't have any data on electrical objects. In an example embodiment, the user may query and receive a view of electrical objects details from CPDB with specific co-ordinates. In an example embodiment, objects may be differentiated by colors. According to an example embodiment, the user may then select the electrical objects colors as a stop point, enabling the field crew to find the pipeline points where high voltage electrical objects are passing through or where they located relative to other objects. In an example embodiment, the server side application may be utilized for running these queries and views may be generated. In an example embodiment, the mobile side application program may trace objects based on styles.

Scenario 5: According to an example embodiment, one or more difference views may be created. For example, a user may compare traditional data with CPDB data. In an example embodiment, differences can be shown using a difference viewer that may present two views (traditional and CPDB). In an example embodiment, such views may vary based on request. In an example embodiment, one or more differences for particular objects characteristics may be viewed by object location. According to example embodiments, one or more difference views may be utilized to view status, history records, failure record, outage information, etc. In an example embodiment, one or more vertical slicing views may be used to depict a mixture of objects in the given location. In an example embodiment, a difference of all set of objects interacting with specific objects within a given radius may be viewed.

Scenario 6: There may be several cases where a user needs to update information related to product or non-product databases. For example, there may be changes where bulk information needs to be updated. In this example embodiment, multiple queries may be created and send back to the server side application program, which may process the queries and update the CPDB. For example, suppose that several objects belonging to different datasets at a particular location have been moved. In such an example embodiment, the field crew can update individual object data or coordinate data using SMS requests. If there is a material change to an object, such as a main pipe, an SMS message can be sent, for example with the following information: Coordinate—X1, Y1, Object Name—Main Pipe, Material—Plastic. In another example, if there is a new valve added to at coordinate location X1,Y1, an SMS message can be sent with the following information: Coordinate—X1, Y1, Object Name—Valve, Status—Open.

Scenario 7: Certain example embodiments of the invention provide for removing duplicate information. For example object records may be maintained in a spatial table, and there is a possibility for duplication of objects to the nearest spatial table due to inaccuracies in reporting object data. Often, such duplicates would be within a known proximity distance. According to an example embodiment, to eliminate such duplicates, a query tool may be used to query similar objects with a predefined proximity distance. According to an example embodiment, the resulting duplicate object from the query may be replaced with one object whose spatial location is the average of some or all of the duplicate objects spatial location.

Various system parts, servers, processors, networks, databases, and/or mobile devices may be utilized for receiving/sending location data, retrieving/saving database information, and for providing information, according to example embodiments of the invention, will now be described with reference to the accompanying figures.

FIG. 1 illustrates an example common pool database (CPDB) system 100, according to an example embodiment of the invention. According to an example embodiment of the invention, the CPDB system may include a server 102 having a memory 104, one or more processors 106, one or more input/output interfaces 108, and/or one or more network interfaces 110. In an example embodiment, the memory 104 may include an operating system and data 114. According to an example embodiment of the invention, the memory 104 may include a server side CPDB module 116 for processing various queries. According to an example embodiment, the CPDB system 100 may include a local workstation 118.

In an example embodiment, the CPDB system 100 may include (or be in communication with) one or more networks 120 that may be utilized to communicate with a database 122, mobile devices 124, wireless networks 126, and/or remote workstations 128. According to example embodiments of the invention, the mobile devices 124 may include a mobile application program 138 that may provide formatting, display, and protocols for sending and receiving information, and for formatting views. In an example embodiment the mobile application program 138 may include location data 130. In an example embodiment, the location data 130 may include objects 132, parameters 134 related to the objects 132 and/or related objects. According to an example embodiment, the location data may also include unstructured information 136.

Figure 2:
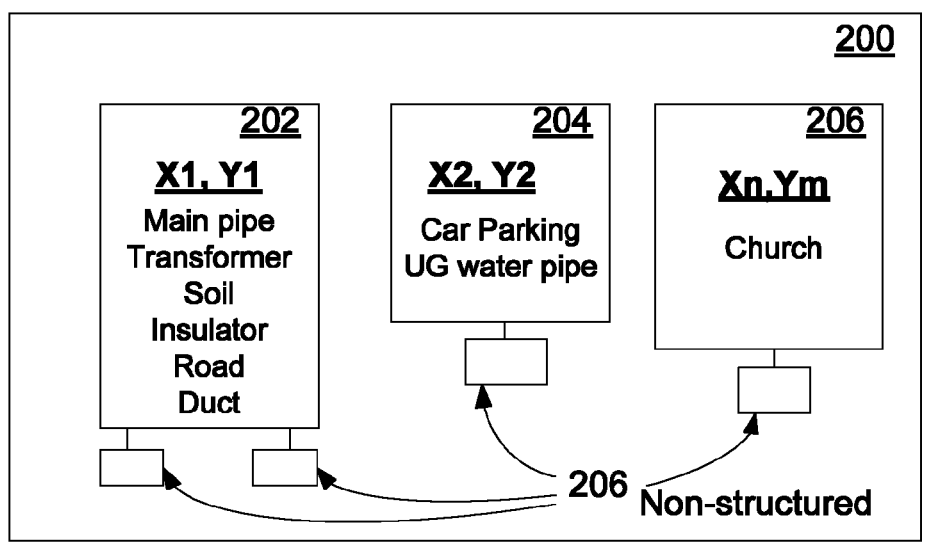
FIG. 2 is a block diagram of illustrative common pool data structures according to an example embodiment of the invention.

FIG. 2 depicts an example depicts an example common pool database structure 200, according to an example embodiment of the invention. For example, the structure 200 may include a first object 202 at spatial coordinates X1, Y1. In an example embodiment, the first object 202 may be described with structured and unstructured parameters related to the object. For example, the first object 202 may be described with descriptive parameters such as main pipe, transformer, soil type, insulator, road, duct, etc. Additional non-structured data 206 may be associated with the first object 202. In an example, the structure 200 may include a second object 204, which may be located at spatial coordinates X2, Y2, and may be described with parameters such as car, parking, underground water pipe, etc. In another example, the structure 200 may include items, such as landmarks (a church, for example) located at spatial coordinates Xm, Yn.

Figure 3:
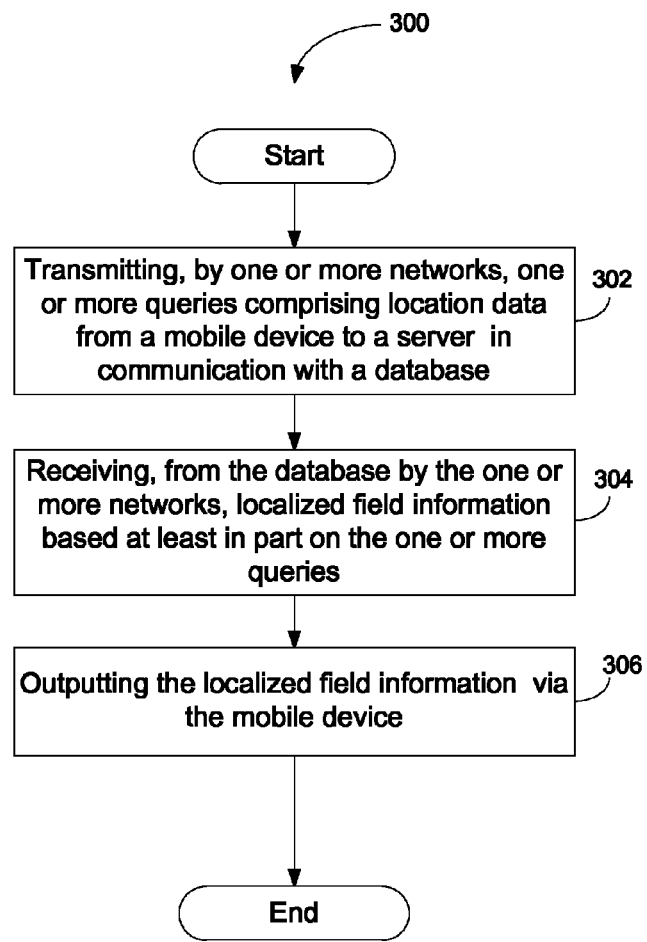
FIG. 3 is a flow diagram of an example method according to an example embodiment of the invention.

An example method 300 for utilizing a common pool database will now be described with reference to the flowchart of FIG. 3. The method 300 starts in block 302, and according to an example embodiment of the invention, includes transmitting, by one or more networks, one or more queries comprising location data from a mobile device to a server in communication with a database. In block 304, and according to an example embodiment, the method 300 includes receiving, from the database by the one or more networks, localized field information based at least in part on the one or more queries. In block 306, and according to an example embodiment, the method 300 includes outputting the localized field information via the mobile device. The method 300 ends after block 306.

Example embodiments of the invention may include transmitting, by one or more networks (120), field information (130, 132, 134, 136) related to one or more utility objects (132) within a predefined distance of the location data (130) from the mobile device (124) to the server (102) in communication with the database (122). Example embodiments of the invention may include storing the field information (130, 132, 134, 136) in the database (122). According to example embodiments, the field information (130, 132, 134, 136) can include one or more of structured parameters (134) or unstructured information (136), wherein the structured parameters (134) include standard descriptors, and wherein the unstructured information (136) includes one or more of: text, graphics, images, audio or video. Example embodiments of the invention may include responding to queries or requests for specific utility information. Example embodiments of the invention may include location data (130) which may include global position system (GPS) coordinates. Example embodiments of the invention may include sending or receiving localized field information (130, 132, 134, 136) which may include one or more of: structural information, visual cues, composition, schematics, condition, history, status, intersecting utility networks, descriptors, text, graphics, images, audio or video.

Example embodiment of the invention may include a system and/or apparatus for controlling and coordinating common pool database information. Example embodiments of the system and/or apparatus may include a database (122); a server (102) comprising at least one processor (106) in communication with the database (122); and one or more networks (120) in communication with the server (102). Example embodiments of the system and/or apparatus may include at least one mobile device (124) configured for: transmitting, by one or more networks (120), one or more queries comprising location data (130) to the server (102); receiving, from the database (122) by the one or more networks (120), localized field information (130, 132, 134, 136) based at least in part on the one or more queries; and outputting the localized field information (130, 132, 134, 136) on the mobile device (124). According to an example embodiment, the at least one mobile device (124) is further configured for transmitting, by the one or more networks (120), field information (130, 132, 134, 136) related to one or more utility objects (132) within a predefined distance of the location data (130) to the server (102) in communication with the database (122). According to an example embodiment, the server (102) is configured storing the field information (130, 132, 134, 136) in the database (122).

According to an example embodiment, field information (130, 132, 134, 136) includes one or more of structured parameters (134) or unstructured information (136), wherein the structured parameters (134) includes standard descriptors, and wherein the unstructured information (136) comprises one or more of: text, graphics, images, audio or video. According to an example embodiment, one or more queries may include a request for specific utility information. According to an example embodiment, the location data (130) includes global position system (GPS) coordinates. According to an example embodiment, the localized field information (130, 132, 134, 136) includes one or more of: structural information, visual cues, composition, schematics, condition, history, status, intersecting utility networks, descriptors, text, graphics, images, audio or video.

According to example embodiments, certain technical effects can be provided, such as creating certain systems, methods, and apparatus that allow utilities to analyze use non-product datasets in their analysis of a network. Example embodiments of the invention can provide the further technical effects of providing systems, methods, and apparatus for keeping utility data updated with the most recent data, and to save on costs associated with maintaining utility objects.

In example embodiments of the invention, the common pool database system 100 may include any number of hardware and/or software applications that are executed to facilitate any of the operations.

In example embodiments, one or more I/O interfaces may facilitate communication between the common pool database system 100 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the common pool database system 100. The one or more I/O interfaces may be utilized to receive or collect data and/or user instructions from a wide variety of input devices. Received data may be processed by one or more computer processors as desired in various embodiments of the invention and/or stored in one or more memory devices.

One or more network interfaces may facilitate connection of the common pool database system 100 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ (owned by Telefonaktiebolaget LM Ericsson) enabled network, a Wi-Fi™ (owned by Wi-Fi Alliance) enabled network, a satellite-based network any wired network, any wireless network, etc., for communication with external devices and/or systems.

As desired, embodiments of the invention may include the common pool database system 100 and common pool data structure with more or less of the components illustrated in FIGS. 1 and 2.

Certain embodiments of the invention are described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method for utilizing a common pool database comprising:

transmitting, by one or more networks, one or more queries comprising location data from a mobile device to a server in communication with a database, wherein the location data comprises a spatial location of one or more objects, wherein the one or more objects comprises either (1) respective object names, materials, lengths, and embedded valves, or (2) respective object names, addresses, and shortest paths to reach a location or address;

receiving, from the database by the one or more networks, localized field information associated with the one or more objects based at least in part on the one or more queries; and outputting the localized field information via the mobile device.

2. The method of claim 1, further comprising transmitting, by the one or more networks, field information related to one or more utility-objects within a predefined distance of the location data from the mobile device to the server in communication with the database.

3. The method of claim 2, further comprising storing the field information in the database.

4. The method of claim 2, wherein the field information comprises one or more of structured parameters or unstructured information, wherein the structured parameters comprise standard descriptors, and wherein the unstructured information comprises one or more of: text, graphics, images, audio or video.

5. The method of claim 1, wherein the one or more queries further comprise a request for specific utility information.

6. The method of claim 1, wherein the location data comprise global position system (GPS) coordinates.

7. The method of claim 1, wherein the localized field information includes one or more of: structural information, visual cues, composition, schematics, condition, history, status, intersecting utility networks, descriptors, text, graphics, images, audio or video.

8. A system for controlling and coordinating common pool database information, comprising:
   a database;
   a server comprising at least one processor in communication with the database;
   one or more networks in communication with the server; and
   at least one mobile device configured for:
      transmitting, by one or more networks, one or more queries comprising location data to the server database, wherein the location data comprises a spatial location of one or more objects, wherein the one or more objects comprises either (1) respective object names, materials, lengths, and embedded valves, or (2) respective object names, addresses, and shortest paths to reach a location or address;
      receiving, from the database by the one or more networks, localized field information associated with the one or more objects based at least in part on the one or more queries; and
      outputting the localized field information on the mobile device.

9. The system of claim 8, wherein the at least one mobile device is further configured for transmitting, by the one or more networks, field information related to one or more utility objects within a predefined distance of the location data to the server in communication with the database.

10. The system of claim 9, wherein the server is configured storing the field information in the database.

11. The system of claim 9, wherein the field information comprises one or more of structured parameters or unstructured information, wherein the structured parameters comprise standard descriptors, and wherein the unstructured information comprises one or more of: text, graphics, images, audio or video.

12. The system of claim 8, wherein the one or more queries further comprise a request for specific utility information.

13. The system of claim 8, wherein the location data comprise global position system (GPS) coordinates.

14. The system of claim 8, wherein the localized field information includes one or more of: structural information, visual cues, composition, schematics, condition, history, status, intersecting utility networks, descriptors, text, graphics, images, audio or video.

15. An apparatus for controlling and coordinating common pool database information, comprising:
   a database;
   a server in communication with the database and one or more networks, the server
   comprising at least one processor and configured for:
      receiving one or more queries comprising location data, wherein the location data comprises a spatial location of one or more objects, wherein the one or more objects comprises either (1) respective object names, materials, lengths, and embedded valves, or (2) respective object names, addresses, and shortest paths to reach a location or address;
      outputting stored localized field information from the database to one or more external devices, by the one or more networks, based at least in part on the one or more queries.

16. The apparatus of claim 15, wherein the server is further configured for receiving by the one or more networks, field information related to one or more utility objects within a predefined distance of the location data.

17. The apparatus of claim 16, wherein the server is further configured storing the field information in the database.

18. The apparatus of claim 16, wherein the field information comprises one or more of structured parameters or unstructured information, wherein the structured parameters comprise standard descriptors, and wherein the unstructured information comprises one or more of: text, graphics, images, audio or video.

19. The apparatus of claim 15, wherein the one or more queries further comprise a request for specific utility information.

20. The apparatus of claim 15, wherein the localized field information includes one or more of: structural information, visual cues, composition, schematics, condition, history, status, intersecting utility networks, descriptors, text, graphics, images, audio or video.

* * * * *